United States Patent
Shih

(10) Patent No.: US 9,713,215 B2
(45) Date of Patent: Jul. 18, 2017

(54) IDENTIFICATION OF STORAGE DEVICE FOR TROUBLE SHOOTING

(71) Applicant: Quanta Computer Inc., Taoyuan (TW)

(72) Inventor: Ching-Chih Shih, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 14/801,403

(22) Filed: Jul. 16, 2015

(65) Prior Publication Data

US 2017/0018149 A1 Jan. 19, 2017

(51) Int. Cl.
G08B 5/36 (2006.01)
H05B 33/08 (2006.01)
H05B 37/02 (2006.01)
G05B 15/02 (2006.01)

(52) U.S. Cl.
CPC ......... *H05B 33/0842* (2013.01); *G05B 15/02* (2013.01); *H05B 37/0227* (2013.01)

(58) Field of Classification Search
CPC .................................................. G08B 5/36
USPC ............. 340/691.1, 815.42, 635; 714/43, 44, 714/E11.206
See application file for complete search history.

(56) References Cited

U.S. PATENT DOCUMENTS

| 8,291,266 B2* | 10/2012 | Windell ............... G06F 11/325 709/224 |
| 2003/0197619 A1* | 10/2003 | Lawrence .......... H05K 7/20836 340/635 |
| 2007/0055740 A1 | 3/2007 | Luciani et al. |
| 2012/0194350 A1* | 8/2012 | Crisp .................. H05K 7/1498 340/815.42 |

FOREIGN PATENT DOCUMENTS

| CN | 104461800 A | 3/2015 |
| TW | 201418974 A | 5/2014 |

OTHER PUBLICATIONS

Taiwanese Office Action for Application No. 104133726, mailed Feb. 17, 2017, w/ First Office Action Summary.

* cited by examiner

*Primary Examiner* — Toan N Pham
(74) *Attorney, Agent, or Firm* — Nixon Peabody LLP; Zhou Lu

(57) ABSTRACT

A management controller can dynamically manage a status light of a storage device in a server rack system. For example, an administrative device can determine which storage device in the server rack has a problem and can send an out-of-band request to the management controller indicating the error associated with a particular storage device. The request includes a command to operate a light associated with the failed storage device. The management controller can then generate commands for operating the status light associated with the failed storage device via at least one of a light controller or a SAS expander.

20 Claims, 7 Drawing Sheets

IDENTIFICATION OF STORAGE DEVICE FOR TROUBLE SHOOTING

TECHNICAL FIELD

The disclosure generally relates to remote management of a storage device in a server for the purposes of troubleshooting.

BACKGROUND

Conventional server racks utilized in a datacenters or elsewhere typically include a server with one or more storage devices (e.g., hard-disk drives) and/or other components. As technologies for server racks have evolved, the number of servers incorporated into such server racks has increased. As a result, the number of storage devices and/or other components is continually increasing in server racks. Further, as the number of storage devices in a server rack increases, the task of identifying which storage devices have experienced error becomes more and more complex in large datacenters.

Typically, an operator (e.g., service technician) identifies a storage device with an error by manually identifying an activated status light for the storage device located outside the server rack. However, such a procedure is typically only available via in-band control and can be triggered only by the server's internal processes. That is, the illumination of the light occurs in response to signals from the server's operating system. As a result, if the error is accidentally cleared by the server, there is no efficient means for reactivating the status light and the technician will be unable to identify the affected storage device.

SUMMARY

The present technology is directed to systems and methods in which a management controller is configured for dynamically managing a status light of a storage device in a server rack to assist a technician or other personnel in the identification of faulty storage devices or other components in a server. In some implementations, the management controller is configured to determine which storage device in the server rack has experienced an error and support remote control commands for the storage device from a remote administrative device. For example, a remote administrator device can determine that a storage device in a server has experienced an error or is otherwise faulty and send a request to the management controller in the server to cause a status light associated with storage device to be operated. In some implementations, the request can include an identifier for the faulty storage device and an identifier for a server in which the failed storage device is installed. Such a request can also include the commands needed for causing the status light associated with the failed storage device to be operated. Upon receipt of such a request, the management controller can forward the command to a light controller or a SAS expander. The light controller or the SAS expander can then execute the command to trigger the status light associated with the failed storage device to be operate to indicate a failure or error.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
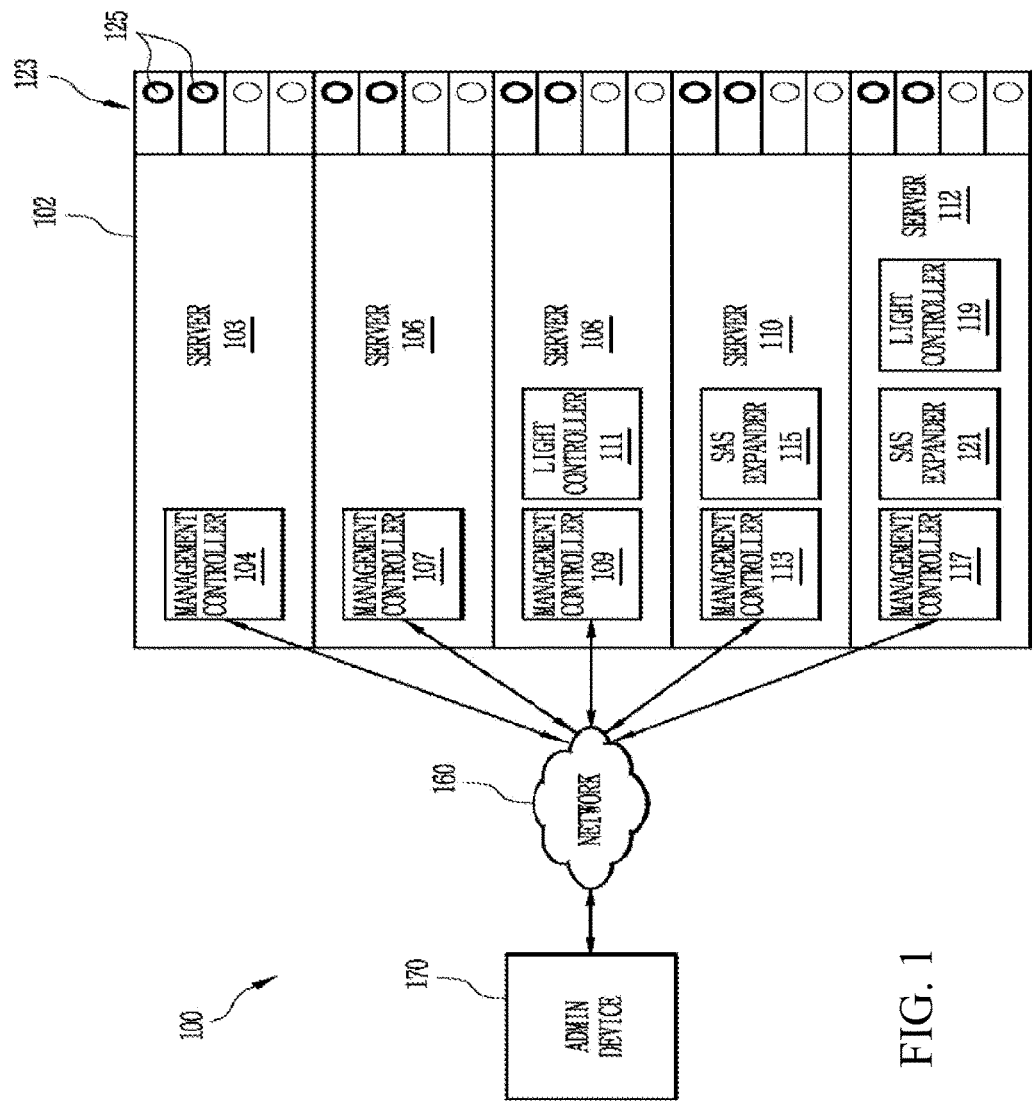
FIG. 1 is a block diagram of an exemplary system for illustrating storage device management in a server rack.

FIG. 1 is a block diagram of an exemplary system 100 for illustrating storage device management in a server rack. As shown in FIG. 1, system 100 includes a server rack 102. The server rack 102 can include servers 103, 106, 108, 110, and 112. The present disclosure contemplates that each of these servers can be any type of server, including application servers, communications servers, storage servers, web servers, to name a few. Further, the present disclosure contemplates that any of the servers in FIG. 1 can be substituted for any other type of computing device.

The server rack 102 can be implemented as chassis providing an assembly for a plurality of components designed to be mounted to the server rack 102. In some cases, the server rack 102 can include various subsystems for supporting the operating of various computing devices. The server rack 102 can also be arranged such that airflow and access to the computing devices and other electrical subsystems mounted therein is facilitated. The chassis of the server rack 102 can be configured to mechanically and electrically support servers 103, 106, 108, 110, and 112 and components therein.

Each of servers 103, 106, 108, 110 and 112, can be a managed server device that includes a management controller 104, 107, 109, 113, and 117, respectively. For example, each of management controllers 104, 107, 109, 113, and 117 can be a baseboard management controller (BMC) configured to provide out-of-band management/administration of the corresponding server. Such a baseboard management controller can operate independently of the central processing unit and/or operating system of the corresponding server.

As shown in FIG. 1, each of servers 103, 106, 108, 110, and 112 can include storage devices 123, such as a hard-disk drives or any other type of storage device, to store data files or computer program instructions. These serves can also include other components not show in FIG. 1. Each of storage devices 123 can also include a status light 125 to indicate the current status of a respective one of storage devices 123. However, more than one status light can be associated with each of storage devices 123. Further, the storage devices 123 can be configured such that the status light 125 operates differently under different conditions. For example, in the case of a failure or error, each of storage devices 123 can be configured to provide a particular type of illumination at the corresponding one of the status light 125. That is, the status light can operate in one way under normal operation conditions and in a different way in case of a failure or error. In some implementations, the status light can change color to indicate a failed storage device. For example, a status light that is green can indicate that no attention is needed, whereas, a status light that is red can indicate that service is needed. In other implementations, the status light can change its illumination pattern or timing to indicate a failed storage device. For example, the status light can be a steady light indicating that no attention is needed, whereas, a status light that is flashing can indicate that service is needed. In still other implementations, a combination of color and pattern changes can occur. For example, the status lights of a storage device can flash, blink, be presented as a steady light, and/or be presented in a different color.

In the various embodiments, the number and types of status lights associated with a particular storage device can vary. For example, a hard disk drive can be associated with activity LED which is typically controlled by the disk drive to indicate whether or not it is currently in use and a status LED that is typically controlled by the disk drive or the operating system to indicate whether the disk drive is currently online, offline, in an error condition, etc. The present disclosure contemplates that in the various embodiments, the methods described herein can be utilized to control such status lights singly or in combination to provide the necessary indications to the user. However, the various embodiments are not limited in this regard and the present disclosure contemplates that a storage device can include more or less status lights than discussed above. For example, in particular embodiments, a status light can be provided that this dedicated for locating or identifying the storage device. Such a status light can be used singly or in combination to provide the necessary indications to the user. For example, this status light can be illuminated in a first manner to assist the user identifying the storage device currently failing, while other status lights for the storage device can be illuminated in a second manner to communicate information to the user, such as the reason for the failure of the storage device, that it is safe to remove the storage device, or any other information that might be pertinent to the user servicing the storage device.

The status lights 125 can be arranged in the server rack 102 so that they are visible from the outside of the server rack 102 without the need to remove the storage devices 123 and/or the corresponding ones of servers 103, 106, 108, 110, or 112 out of the server rack 102. The status lights 125 can thus direct service technicians to the correct one of servers 103, 106, 108, 110, or 112 and the failed one of storage devices 123 to effect any necessary repairs or replacement of the one of servers 103, 106, 108, 110, or 112 and/or the failed one of storage devices 123. Note that the present disclosure contemplates that the status light 125 can be operated to indicate a failure or error at the storage devices 123 or at any supporting components in corresponding ones of servers 103, 106, 108, 110, and 112. Examples of errors which can trigger operation of the status light in this fashion include power supply failures, fan failures, or any other failure in a supporting server that needs to be repaired, as well as any failure of a storage device. A status light indicating a failure can be operated to continue indicating a failure until the error or failure is corrected. For example, until a failed storage device or other component is replaced and/or repaired.

In some embodiments, the status lights 125 can be implemented using light-emitting diode (LED) lights. In particular embodiments, the status lights 125 can be serial general purpose input/output (SGPIO) LED lights, a 4-signal bus used between a host bus adapter (HBA) and a backplane.

Management controllers 104, 107, 109, 113, 117 can be configured with an operating system and/or other computer-readable instructions to perform remote control of the storage devices 123, as described herein. For example, the management controllers 104, 107, 109, 113, 117 can obtain server configuration information from administrative device 170 (e.g., laptop computer, tablet computer, smartphone, etc.) through network 160 (e.g., local area network, wide area network, the Internet, etc.), which indicate the storage device requirements of the server rack 102 and/or servers 103, 106, 108, 110, and 112 in the server rack 102. The management controllers can use an intelligent platform management interface (IPMI) or a Redfish application program interface (API) to control the status lights remotely. Management controllers can also be configured to communicate with the light controller and/or a serial attached SCSI (SAS) expander. For example, as shown in servers 108, 110, and 112. An Inter-Integrated circuit/system management bus interface (I2C/SMbus) can be used to direct communications between light controllers 111 and 119 and management controllers 109 and 117, respectively.

In some implementations, light controllers 111, 119 can be light-emitting diode (LED) controllers. Each of light controllers 111 and 119 can be associated with each of the storage devices 125 within a respective one of servers 108 and 112. In particular implementations, the light controllers 111 and 119 can be serial general purpose input/output (SGPIO) LED controllers. In some embodiments, the light controllers 111 and 119 can be located in the backplane of the server. For example, the SGPIO LED controller can be configured to control backplane storage device status lights. Such a SGPIO LED controller can be managed via one or more interfaces, such as Inter-Integrated circuit/system management bus (I2C/SMbus) or a SGPIO controller interface.

The SAS expanders 115 and 121 can be configured to communicate with the management controllers or the light controllers to support remote management capability. In some implementations, a serial ATA (SATA) host bus adapter (HBA) can be replaced with the SAS expander. The SAS expanders 115 and 121 can also use a SGPIO controller interface to control the SGPIO LED controller.

In some embodiments, in addition to status lights 125, additional status lights (not shown) can be provided in a chassis for server rack 102 and/or the chassis for servers 103, 106, 108, 110, and 112. In operation, alternatively or in addition to the status lights 125, these additional status lights can be used to facilitate the identification of the server rack 102 and/or the one of servers 103, 106, 108, 110, and 112 containing a failed storage device or other components. In some embodiments, these additional status lights can be arranged in the server rack 102 so that they are visible from the front and/or the rear of the affected chassis without removing or adjusting any components in the server rack 102. These status lights can therefore direct service technicians to the correct chassis during the repair. In some embodiments, each chassis can have at least two light-emitting diodes (LEDs), such as a health status LED and an attention status LED. For example, when the LED is green, it indicates that no attention is needed. When the LED is red, it indicates that it needs attention. However, the various embodiments are not limited in this regard and the present disclosure completes that any number of status lights, patterns, timing, and colors can be utilized at the chassis or other failed component.

For purposes of monitoring the storage devices, 123, each of storage devices 123 can be associated with an identifier that contains information about the storage device (e.g., type, capacity, interface, etc.) and an address of the storage device in the server rack 102. The identifier information for a storage device can also be associated with the status light of the storage device. Therefore, when the identifier information for a storage device is sent to a remote administrator device for troubleshooting, such as administrative device 170, the information needed for sending a command to operate the status light of the failed storage device is included with the identifier information for the failed storage device. Identifier information that identifies the chassis (e.g., the rack and/or server in the rack) can also be sent with the identifier information of the failed storage device.

Figure 2A:
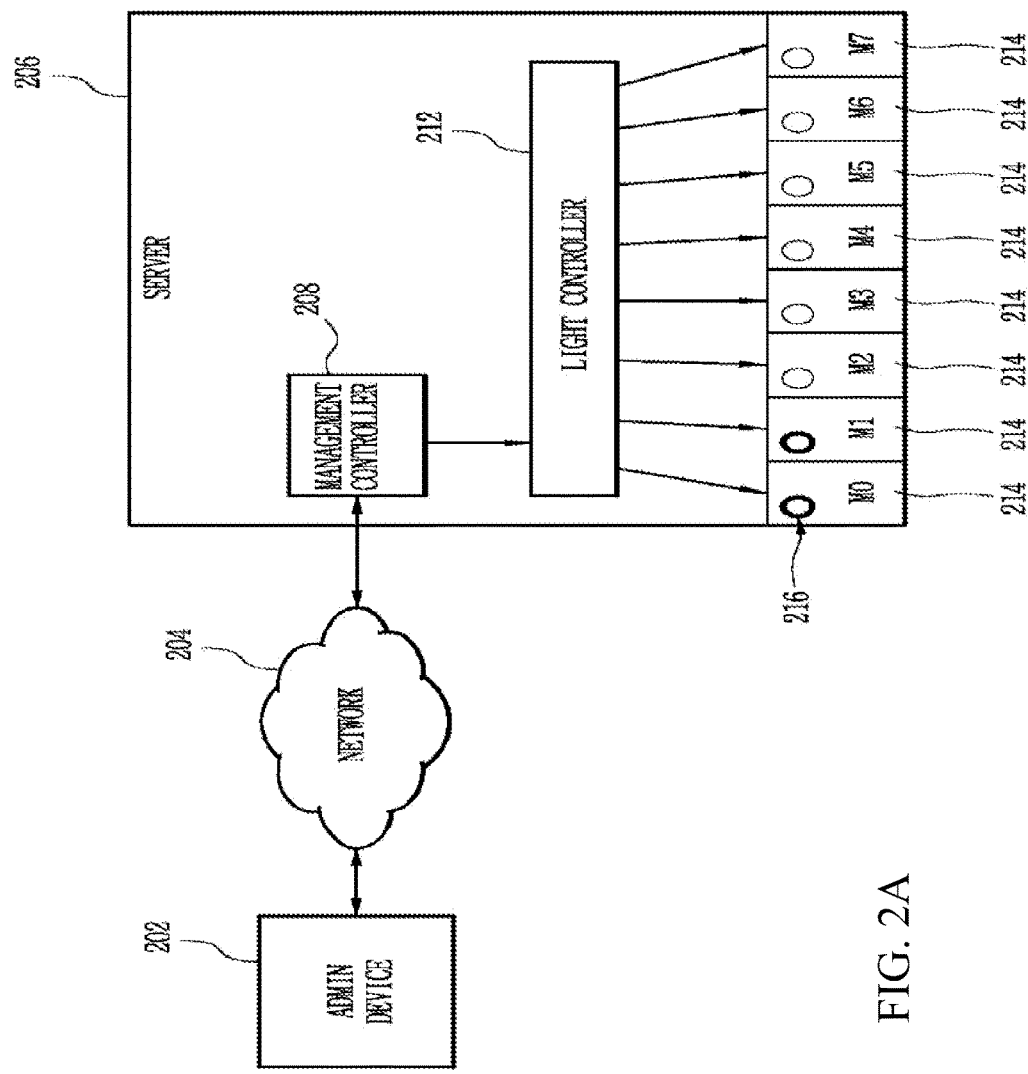
FIGS. 2A, 2B, and 2C are exemplary system diagrams for illustrating control of a status light for storage devices in server.
Figure 2B:
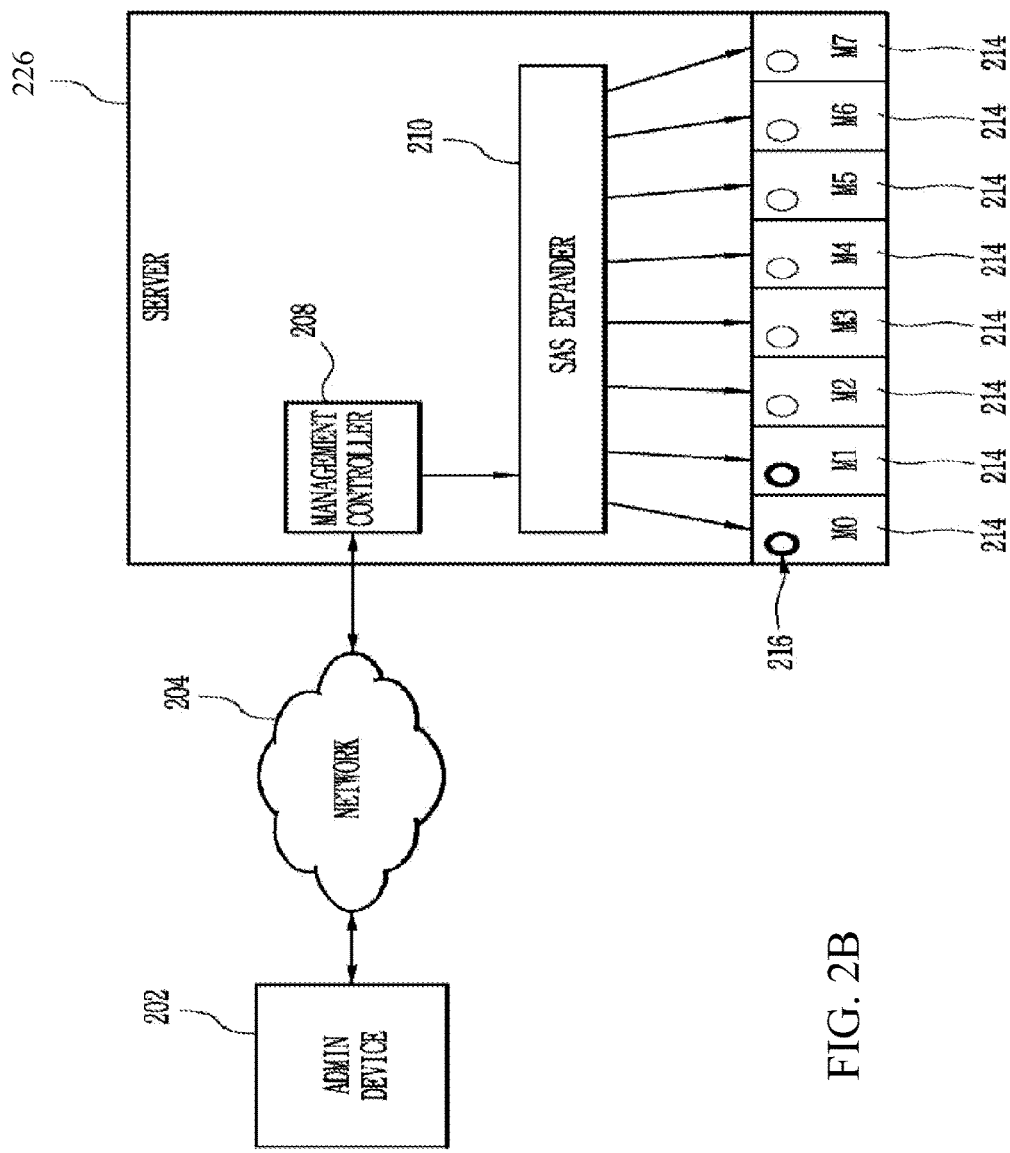
Figure 2C:
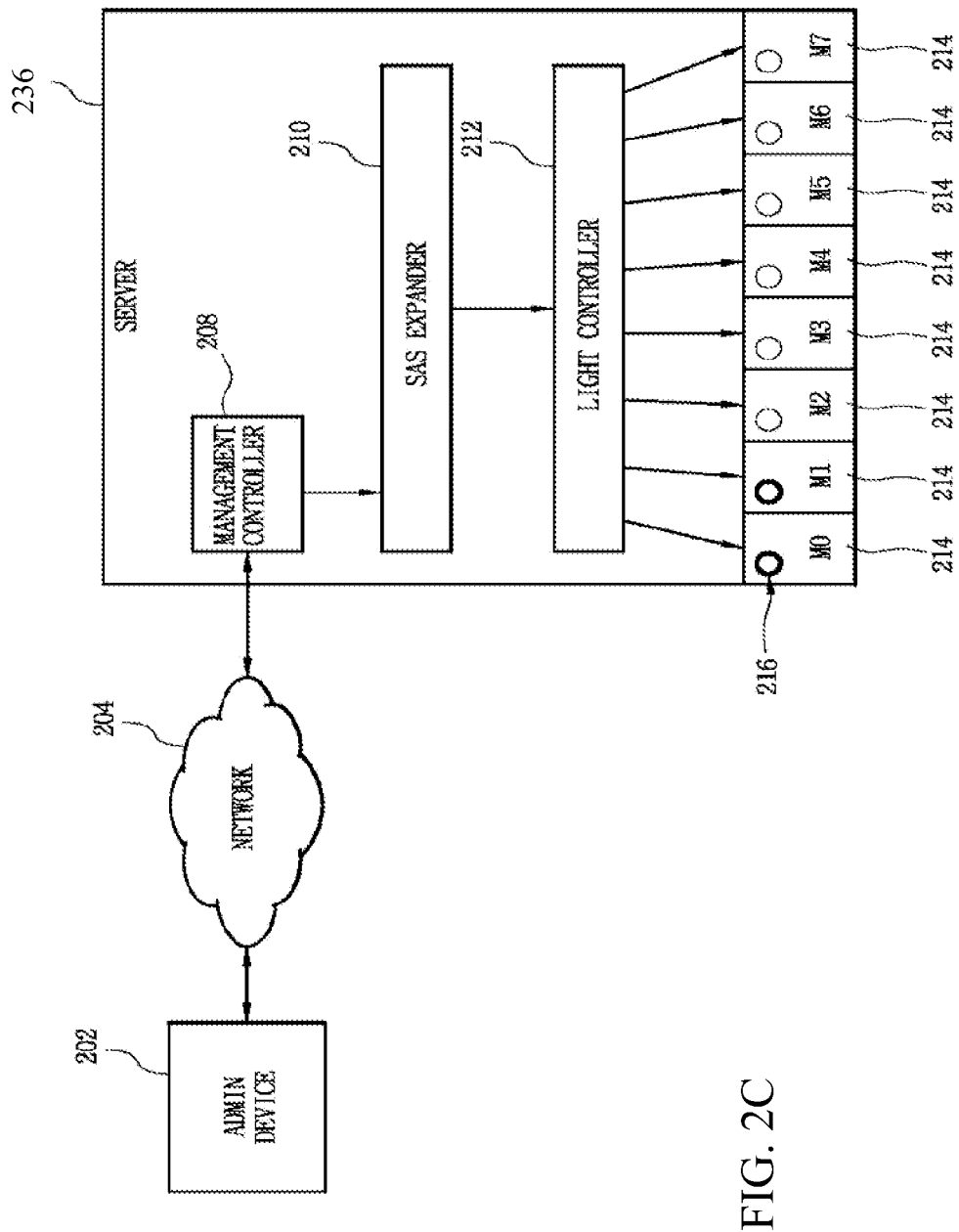

As shown in FIG. 1, server rack 102 and include servers with different components are illustrated to show different embodiments of the server system, as illustrated by the different components of servers 103, 106, 108, 110, 112. Thus, the operation of the status lights for each of these configurations can vary. The operation of such configurations is described below in greater detail with respect to FIGS. 2A-2C. FIGS. 2A, 2B, and 2C are exemplary system diagrams for illustrating control of a status light for storage devices in server. FIGS. 2A, 2B, and 2C illustrate the operation of configurations similar to servers 108, 110, and 112 of FIG. 1, respectively.

Turning first to FIG. 2A, a server 206 is shown with a management controller 208, a light controller 212, and associated storage devices 214. Such a configuration can be used in configurations where the storage devices 214 (and thus the light controller 212) are located within the same node as the server 206 and are therefore associated with the same management controller 208. Thus, in such a configuration, the management controller can be configured to directly access the light controller 212 to communicate with each other. Further, each of the storage devices 214 (M0-M7) can be associated with the management controller 208 and the light controller 212. That is, although not illustrated in FIG. 2A, the management controller can also communicate with the storage device 214. As discussed above, the status light 216 of each of storage devices 214 can be operated so as to indicate a current status of each of storage device 214. For example, the status light 216 of the storage devices M0 and M1 can have different lighting from the rest of the status lights of storage devices M2-M7 to show that the storage devices M0 and M1 are faulty and require remedial action. As discussed above, the status lights of these storage devices can be configured to flash, blink, be presented as a steady light, and/or be presented in a different color to indicate a fault or error. However, the various embodiments are not limited in this regard and other configurations for operating the status lights are possible to indicate that a storage device has failed.

In operation, the administrator device 202 can detect that one of the storage device 214 within the server 206 has failed or has encountered some error. In some embodiments, the detection can occur via an out-of-band process, i.e., via the management controller 208. That is, the management controller 208 can detect the fault or error and transmit a message to the administrative device 202 over network 204. In other embodiments, the detection can occur via an in-band process. That is, operating system of server 206 can detect the fault or error and cause a message to be transmitted to the administrative device 202. In either case, the message can include information for allowing the administrative device to identify the failed storage device and, optionally, the server 206 and/or rack the failed storage device is located in. In response to the administrative device 202 detecting that one or more of the storage devices 214 have failed, the administrative device 202 can send a request over network 208 to the management controller 208 to operate the status lights 216 associated with the failed storage devices. The request can include an identifier for the failed storage device in server 206 and, if necessary, an identifier for server 206 and/or the rack that server 206 is mounted in. In particular embodiments, the identifier can also include storage device information and its address in the server rack system.

The management controller 208 then receives the request from the administrative device 202 through the network 204. In implementations where the administrative device 202 detection processes were in-band, the request can identify to the management controller 208 that one or more of storage devices 214 have failed. The request can also include a command to illuminate the status lights associated the failed storage devices in the server 206. The management controller 208 can then forward the request to the light controller 212, which in turn can trigger the status lights 216 associated with the failed storage devices to operate to indicate a failure or error.

Turning next to FIG. 2B, a server 226 is shown. Similar to FIG. 2A, the server 226 can include a management controller 208 and storage devices 214. However, as shown in FIG. 2B, a SAS expander 210 is provided instead of a light controller. The SAS expander 210 can be in communication with management controller 208, the storage devices 214 (M0-M7), and the status lights 216 for the storage devices 214. Such a configuration can be utilized in the case where the storage devices 214 (and thus the SAS expander 210) are not located on the same node as the server 226. For example in the case of a server node accessing a separate storage node such as a JBOD node. In such a configuration, the management controller 208 on the server 226 can communicate with the with the SAS expander 210 on the storage node to access both the storage devices 214 and the status lights 216 associated with such storage devices via the SAS expander 210.

In operation, the administrator device 202 can detect the failed ones of storage devices 214 within the server 226. This can be performed via in-band or out-of band processes, as discussed above. Thereafter, the administrator device 202 can send a request to the management controller 208 over network 204 to cause operation of the status lights 216 associated with the failed storage devices in order to indicate to an operator or technician that one or more of the storage devices 214 have failed. For example, in the case that storage devices M0-M1 have failed, the status lights 216 associated with these storage devices can be operated, as shown in FIG. 2B.

The request can include the storage device identifier and the chassis identifier (e.g., a server and/or server rack) to designate which of status lights 216 needs to be operated. In particular, the storage device identifier can include storage device information and its address in the server rack system. Upon receipt of such a request, the management controller 208 can forward the request to the SAS expander 210 associated with the failed storage devices. Upon receiving the command, the SAS expander 210 can generate signals, based on the identifier, to cause the status lights 216 associated with the failed storage devices to operate to indicate a failure or error.

Now turning to FIG. 2C, a server 236 is shown, with a management controller 208, a SAS expander 210, and a light controller 212. Similar, to the configuration of FIG. 2B, the configuration of FIG. 2C can be utilized in the case where the storage devices 214 (and thus the SAS expander 210) are not located on the same node as the server 236. For example in the case of a server node accessing a separate storage node such as a JBOD node. In such a configuration, the management controller 208 on the server 226 can communicate with the with the SAS expander 210 on the storage node to access, via the SAS expander 210, both the storage devices 214 and the light controller 212 to control the status lights 216.

In operation, the administrator device 202 can detect the failed ones storage devices 214 within the server 236. This can be performed via in-band or out-of band processes, as discussed above. Thereafter, the administrator device 202 can send a request to the management controller 208 over network to cause operation the status lights 216 associated with the failed storage devices in order to indicate to an operator or technician that one or more of the storage devices 214 have failed. For example, in the case that storage devices M0-M1 have failed, the status lights 216 associated with these storage devices can be operated, as shown in FIG. 2B.

The request can include the storage device identifier and the chassis identifier (e.g., a server and/or server rack) to designate which of status lights 216 needs to be operated. In particular, the storage device identifier can include storage device information and its address in the server rack system. Upon receipt of such a request, the management controller 208 can forward the request to the SAS expander 230. Upon receiving the command, the SAS expander 230 can generate instruction for the light controller 212 to operate the status lights 236. The light controller 212 can then generate control signals for operating the status lights 216 associated with the failed storage devices to indicate a failure or error.

In some configurations, the SAS expander 210 in FIG. 2B or 2C can be configured to have networking capabilities for either in-band communications, out-of-band communications, or both. Thus, communications with the server node could occur in a variety of ways. In other configurations, the storage node can itself include a management controller of its own. Thus, communications to operate the status lights 216 can be sent directly to the storage node rather than via server 226. In still other configurations, rather than providing a separate management controller for the storage node, the SAS expander 210 can be configured to provide some or all the functionality of a management controller. Thus, communications to detect the status of the storage devices 214 and to operate the status lights 216 can occur all via the SAS expander 210.

Figures 3A, 3B:
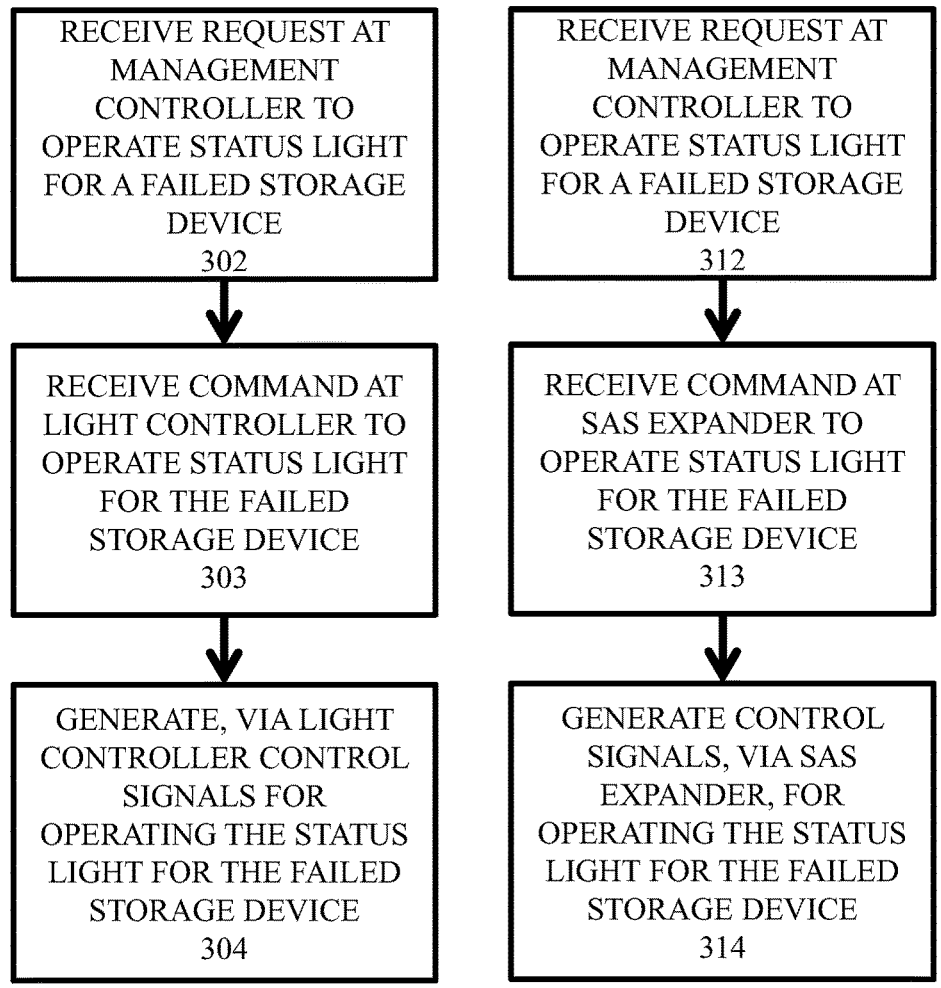
FIGS. 3A, 3B, and 3C are flowcharts of steps in exemplary processes for identification and troubleshooting of a storage device in a server.
Figure 3C:
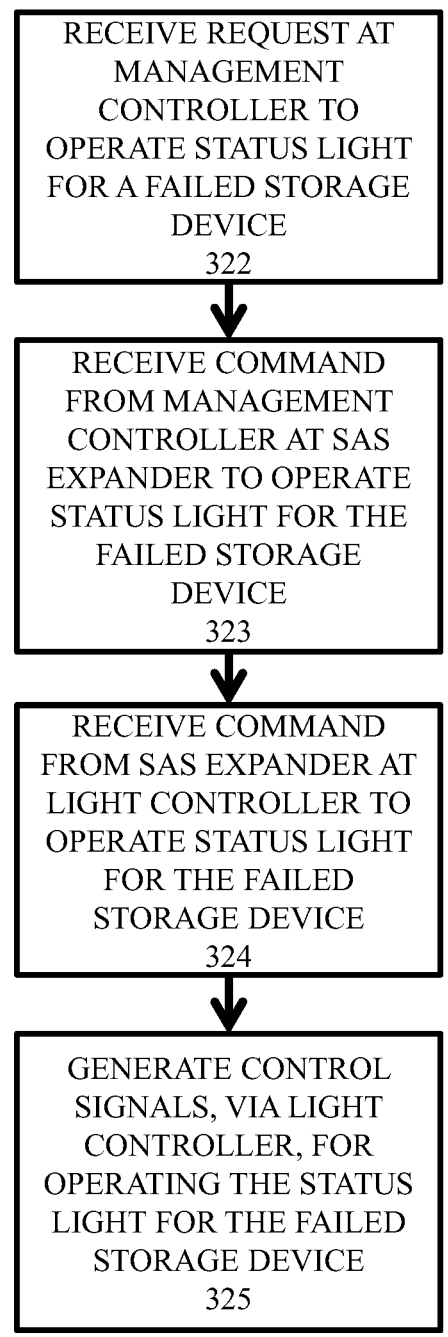

FIGS. 3A, 3B, and 3C are block diagrams illustrating exemplary processes of for troubleshooting storage devices installed in a server according to the embodiments of FIGS. 2A, 2B, and 2C, respectively.

Turning first to FIG. 3A, a process based on control of a light controller begins at step 302. At step 302, a management controller receives a request to operate the status light associated with a failed storage device to indicate a failure or error associated with the failed storage device. For example, as described above with respect to FIG. 2A, a management controller 208 can receive a request from an administrator device 202 over a network 204. As discussed above, the request can include the storage device identifier and identifiers for the server and/or the server rack the failed storage device is associated with. For example, the identifier can include storage device information and its address in the server and/or server rack system.

At step 303, the management controller can then send a command to a light controller associated with the status light for the failed storage device. The command can include an identifier for the particular storage device so that the corresponding status light can be properly identified and operated. Thereafter, at step 304 the light controller can, in response to the command from the management controller, operate the status lights associated with the failed storage devices to indicate a failure or error.

The present disclosure contemplates that in addition to controlling status lights for the failed storage device, a light controller can also be configured to operate additional status lights, such as status lights associated with a server or a server rack associated with the failed storage device. Thus, the light controller can be configured generate additional commands and/or control signals to operate such additional status lights in conjunction with the status lights for the failed storage device to further facilitate locating the failed storage device within a large number of servers and/or server racks. In some embodiments, such additional status lights can be configured to operate in sync with the status lights of the failed storage device. That is, such additional status lights can have a same timing, pattern, and/or color as the status lights for the failed storage device. However, in other embodiments, the additional status lights can be operated differently from those of the failed storage device.

Turning next to FIG. 3B, a process based on control of a SAS expander begins at step 312. At step 312, a management controller receives a request to operate the status light associated with a failed storage device to indicate a failure or error associated with the failed storage device. For example, as described above with respect to FIG. 2B, a management controller 208 can receive a request from an administrator device 202 over a network 204. As discussed above, the request can include the storage device identifier and identifiers for the server and/or the server rack the failed storage device is associated with. For example, the identifier can include storage device information and its address in the server and/or server rack system.

At step 313, the management controller can then send a command to a SAS expander associated with the status light for the failed storage device. The command can include an identifier for the particular storage device so that the corresponding status light can be properly identified and operated. Thereafter, at step 314 the SAS expander can, in response to the command from the management controller, operate the status lights associated with the failed storage devices to indicate a failure or error.

The present disclosure contemplates that in addition to controlling status lights for the failed storage device, a SAS expander can also be configured to generate commands that cause additional status lights in other components attached to the SAS expander to operate. For example, a SAS controller typically operates with a storage device controller that manages the operation of the various storage devices attached to the SAS expander. Such a SAS controller may have access to additional status lights of the server or of other components in the server. Thus, the SAS expander can be configured to generate commands to cause any accessible additional status lights to operate in conjunction with the status lights for the failed storage device to further facilitate locating the failed storage device within a large number of servers and/or server racks. In some embodiments, such additional status lights can be configured to operate in sync with the status lights of the failed storage device. That is, such additional status lights can have a same timing, pattern, and/or color as the status lights for the failed storage device. However, in other embodiments, the additional status lights can be operated differently from those of the failed storage device.

Turning next to FIG. 3C, a process based on control of a SAS expander and a light controller begins at step 322. At step 322, a management controller receives a request to operate the status light associated with a failed storage device to indicate a failure or error associated with the failed storage device. For example, as described above with respect to FIG. 2C, a management controller 208 can receive a request from an administrator device 202 over a network 204. As discussed above, the request can include the storage device identifier and identifiers for the server and/or the server rack the failed storage device is associated with. For example, the identifier can include storage device information and its address in the server and/or server rack system.

At step 323, the management controller can then send a command to a SAS expander associated with the failed storage device. The command can include an identifier for the particular storage device so that the corresponding status light can be properly identified and operated. Thereafter, at step 324 the SAS expander can, in response to the command from the management controller, generate a corresponding command for a light controller associated with the status light for the failed storage device.

Like the command to the SAS expander from the management controller, the command from the SAS expander to the light controller can include an identifier for the failed storage device to ensure the correct status light is operated. The present disclosure contemplates that the identifier received by the SAS expander from the management controller and the identifier provided by the SAS expander to the light controller need not be the same.

Finally, at step 325, in response to the receiving the command from the SAS expander, the light controller can generate the necessary control signals for operating the status lights associated with the failed storage devices to indicate a failure or error.

As discussed above, the present disclosure contemplates that light expander and/or the SAS expander can be configured to control or have access to additional status lights. Therefore, in some embodiments, the SAS expander can generate additional commands for other components to cause additional status lights to operate, as discussed above with respect to FIG. 3B. In other embodiments, the light controller can generate additional commands and/or control signals to cause additional status lights to operate, such as server and/or server rack light, as discussed above with respect to FIG. 3A. In still other embodiments, both the light controller and the SAS controller can generate such commands and/or control signals.

Figure 4:
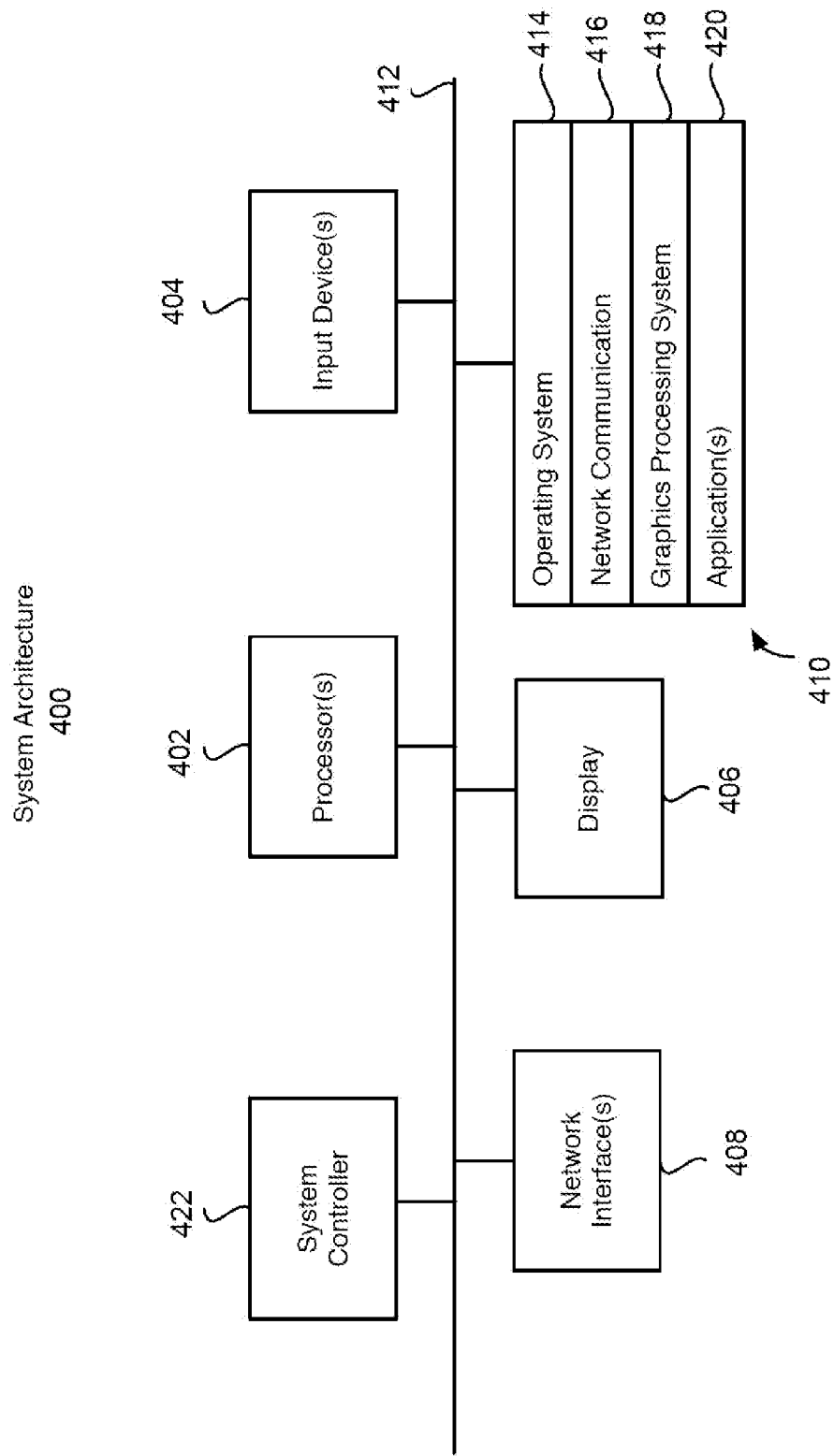
FIG. 4 is a block diagram of an exemplary system architecture for implementing the features and processes of FIGS. 1-3.

FIG. 4 is a block diagram of exemplary system architecture 400 implementing the features and processes of FIGS. 1-3. The architecture 400 can be implemented on any electronic device that runs software applications derived from compiled instructions, including but not limited to: personal computers, servers, smart phones, media players, electronic tablets, game consoles, email devices, etc. In some implementations, the architecture 400 can include one or more processors 402, one or more input devices 404, one or more display devices 406, one or more network interfaces 408, and one or more computer-readable mediums 410. Each of these components can be coupled by bus 412.

Display device 406 can be any known display technology, including but not limited to display devices using Liquid Crystal Display (LCD) or Light Emitting Diode (LED) technology. Processor(s) 402 can use any known processor technology, including but not limited to graphics processors or multi-core processors. Input device 404 can be any known input device technology, including but not limited to a keyboard (including a virtual keyboard), mouse, track ball, touch-sensitive pad or display. Bus 412 can be any known internal or external bus technology, including but not limited to ISA, EISA, PCI, PCI Express, NuBus, USB, Serial ATA or FireWire.

Computer-readable medium 410 can be any medium that participates in providing instructions to processor(s) 402 for execution, including but not limited to non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 410 can include various instructions for implementing an operating system 414 (e.g., Mac OS®, Windows®, Linux). The operating system can be multi-user, multiprocessing, multitasking, multithreading, real-time and the like. The operating system performs basic tasks, including but not limited to recognizing input from input device 404, sending output to display device 406, keeping track of files and directories on computer-readable medium 410, controlling peripheral devices (e.g., disk drives, printers, etc.), which can be controlled directly or through an I/O controller and managing traffic on bus 412. Network communications instructions 416 can establish and maintain network connections (e.g., software for implementing communication protocols, such as TCP/IP, HTTP, Ethernet, etc.).

A graphics processing system 418 can include instructions that provide graphics and image processing capabilities. Application(s) 420 can be an application that uses or implements the processes described in reference to FIGS. 1-3. The processes can also be implemented in operating system 414.

System controller 422 can include a management controller, light controller, or an SAS expander. A management controller can be a controller that operates independently of processor(s) and/or operating system 414. In some implementations, a management controller can be powered and operational before processor(s) 402 are powered on and operating system 414 is loaded into processor(s) 402. For example, a management controller can provide for pre-OS management of the computing device through a dedicated network interface or other input device. For example, a management controller can be a baseboard management controller (BMC) that monitors storage device lights (e.g., status LED lights) and performs low level management of the storage devices, and/or provides remote management capabilities through an intelligent platform management interface (IPMI), keyboard, video, and mouse (KVM) redirection, serial over LAN (SOL), and/or other interfaces. A management controller can be implemented in the processes described with reference to FIGS. 1-3 above.

A light controller can be a light-emitting diode (LED) controller. Light controller can be a controller that controls the lights of the storage device, and provides remote management capabilities through the Inter-Integrated circuit/system management bus (I2C/SMbus) or SGPIO controller interface. The light controller can be a serial general purpose input/output (SGPIO) LED controller. In some embodiments, the light controllers can be located in the backplane of the server. For example, the SGPIO LED controller is configured to control backplane storage device status lights. The SGPIO LED controller can be managed by at least two interfaces such as Inter-Integrated circuit/system management bus (I2C/SMbus) or SGPIO controller interface.

SAS expander (serial attached small computer system interfaces) is a controller that controls the lights of the storage device, and provides remote management capabilities through the Inter-Integrated circuit/system management bus (I2C/SMbus) or SGPIO controller interface. The SAS expander is configured to communicate with the management controllers or the light controllers to support remote management capability. A serial ATA (SATA) host bus adapter (HBA) can be replaced with the SAS expander in this instance. The SAS expander can use SGPIO controller interface to control the SGPIO LED controller.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory, or both. The essential elements of a computer are: a processor for executing instructions; and one or more memories for storing instructions and data. Generally, a computer will also include, or is operatively coupled to communicate with one or more mass storage devices for storing data files; such devices include magnetic disks, such as internal hard disk drives and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disk drives and removable disks; magneto-optical disks; and CD-ROM and DVD-ROM disks. The processor and the memory can be supplemented by, or incorporated in ASICs (application-specific integrated circuits).

To provide for interaction with a user, the features can be implemented on a computer having a display device such as a CRT (Cathode Ray Tube) or LCD (Liquid Crystal Display) monitor for displaying information to the user, and a keyboard and pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and a server are generally remote from each other and typically interact through a network. The relationship of client and server arises by virtue of computer programs running on the respective computers and having a client-server relationship to each other.

One or more features or steps of the disclosed embodiments can be implemented using an API. An API can define one or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be: a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as: input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further, although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
   receiving, by a first controller in a computing device from an remote device through a network interface, a request to operate at least one status light corresponding to a particular storage device, wherein the particular storage device is one of a plurality of storage devices in the computing device;
   sending, by the first controller to a second controller in the computing device, a command to operate the at least one status light corresponding to the particular storage device; and
   in response to receiving the command, generating by the second controller, at least one control signal for operating the at least one status light corresponding to the particular storage device.

2. The method of claim 1, wherein the first controller is a baseboard management controller (BMC).

3. The method of claim 1, wherein the second controller is a SAS expander.

4. The method of claim 1, wherein the at least one status light is a light emitting diode (LED) and the second controller is a serial general purpose input and output (SGPIO) LED controller.

5. The method of claim 1, wherein the request includes an identifier for the particular storage device, and further comprising determining the at least one status light to operate based on the identifier.

6. The method of claim 1, wherein the request includes an identifier for a chassis holding the particular storage device, and further comprising generating at least one control signal for operating at least one additional status light associated with the chassis.

7. The method of claim 1, wherein the control signals are configured to cause the at least one status light to operate in a pre-determined manner for indicating a failure at the particular storage device.

8. A server system comprising:
a plurality of data storage devices, each of the plurality of data storage devices having at least one respective status light;
a management controller coupled to a network; and
at least one second controller communicatively coupling at least the management controller and the plurality of status lights,
wherein the management controller is configured for receiving a request from a remote device over the network indicating a failure of at least one of the plurality of data storage devices and for sending a command to the at least one second controller to operate at least one respective status light for the at least one of the plurality of status lights.

9. The server system of claim 8, wherein the management controller is a baseboard management controller (BMC).

10. The server system of claim 8, wherein the second controller is a SAS expander.

11. The server system of claim 8, wherein at least one respective status light is a light emitting diode (LED) and the second controller is a serial general purpose input and output (SGPIO) LED controller.

12. The server system of claim 8, wherein the request includes an identifier for the at least one of the plurality of data storage devices, and wherein the management controller generates the command based on the identifier.

13. The server system of claim 8, wherein communications between the remote device and the management controller are out-of-band.

14. A method comprising:
receiving, by a first controller in a server device from a remote device over a network, a request to operate at least one status light corresponding to a particular storage device, wherein the particular storage device is one of a plurality of storage devices;
sending, by the first controller to a second controller, a first command to operate the at least one status light corresponding to the particular storage device;
in response to receiving the first command, sending, by the second controller to a third controller, a second command to operate the at least one status light corresponding to the particular storage device; and
in response to receiving the second command, generating by the third controller, at least one control signal for operating the status light corresponding to the particular storage device.

15. The method of claim 14, wherein the first controller is a baseboard management controller (BMC).

16. The method of claim 14, wherein the second controller is a SAS expander.

17. The method of claim 14, wherein the at least one status light is a light emitting diode (LED) and the third controller is a serial general purpose input and output (SGPIO) LED controller.

18. The method of claim 14, wherein the request includes an identifier for the at least one of the plurality of data storage devices, and wherein the first controller generates the first command based on the identifier.

19. The method of claim 14, wherein the request includes an identifier for a chassis holding the particular storage device, and further comprising generating at least one control signal for operating at least one additional status light associated with the chassis.

20. The method of claim 14, wherein the control signals are configured to cause the at least one status light to operate in a pre-determined manner for indicating a failure at the particular storage device.

* * * * *